A. FERRARI.
FUME ARRESTER FOR SMELTING PLANTS.
APPLICATION FILED SEPT. 1, 1917.
1,268,447.
Patented June 4, 1918.
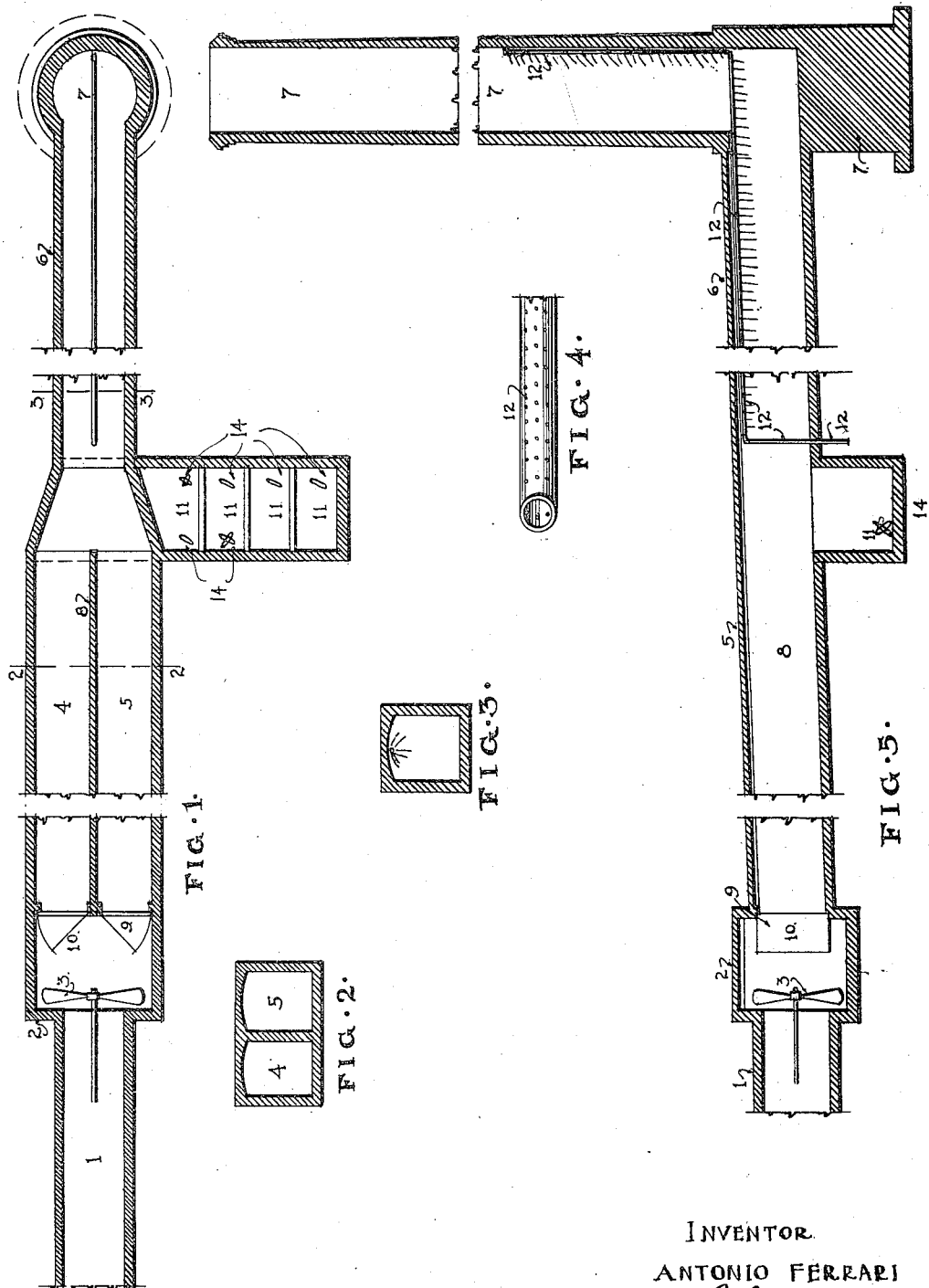
INVENTOR
ANTONIO FERRARI
BY John C. Higdon
ATTORNEY

UNITED STATES PATENT OFFICE.

ANTONIO FERRARI, OF COLLINSVILLE, ILLINOIS.

FUME-ARRESTER FOR SMELTING PLANTS.

1,268,447.  Specification of Letters Patent.  Patented June 4, 1918.

Application filed September 1, 1917. Serial No. 189,424.

*To all whom it may concern:*

Be it known that I, ANTONIO FERRARI, a subject of the King of Italy, and a resident of Collinsville, in the county of Madison and State of Illinois, have invented certain new and useful Improvements in Fume-Arresters for Smelting Plants, of which the following is a specification containing a full, clear, and exact description, reference being had to the accompanying drawings, forming a part hereof.

My invention relates to fume arresters, for smelting plants, and it consists in the novel apparatus hereinafter described and particularly pointed out in the claims, found at the end of this specification.

Heretofore much damage has been done to growing crops, fruits and vegetables, for miles around the smelting plants known to me, and a great loss of the metal being smelted, has been caused by the poisonous fumes discharged into the atmosphere from the stacks of smelting plants.

The object of my invention is to arrest the said fumes before they are discharged into the atmosphere, and thereby prevent the great damage to growing crops in the vicinity of the smelting plant, as well as to condense and precipitate the fumes in a suitable fume-arresting tunnel, from which the precipitated metal is discharged into suitable receiving tanks, where it is treated with well-known chemicals, and thereby recover the condensed and precipitated metal, which is of great value.

In the drawings,

Figure 1 is a horizontal section of an apparatus involving my invention, and connected to the smoke-stack of a smelting plant.

Fig. 2 is a cross-section taken through the twin tunnels, on the line 2—2 of Fig. 1.

Fig. 3 is a cross-section taken through the single tunnel, on the dotted line 3—3 of Fig. 1.

Fig. 4 is a detail view of a portion of the perforated spray pipe, used in cooling, condensing and precipitating the fumes as they are passed through the spray-chamber or single tunnel, and Fig. 5 is a vertical section of my invention, with parts broken away, to economize in drafting space.

In the form of my invention, which has been chosen for the present illustration, I gather up all the smoke and fumes from the furnaces of the smelting plant (whether it be a lead smelter, zinc smelter, aluminum smelter, silver smelter, or a smelter of any other metal), and cause such smoke and fumes to pass from the furnaces by suction of a suitable fan, or other compressed-air device of well-known form, through a suitable passage 1 (which may be of any suitable material) into and through a receiving-chamber 2, which latter I have denominated a "smoke house."

Within said receiving-chamber 2 is mounted, if desired, a common fan or blower 3, for the purpose of drawing the smoke and fumes into said chamber, and forcing them thence into either or both of the twin tunnels 4 and 5, which are made of concrete or any desired material, and preferably 750 feet in length, with an internal size of about 5 feet in height and 5 feet in width, to afford ample cooling and condensing surface in reducing the temperature of the fumes and smoke preliminary to their discharge into the spray-chamber or single tunnel 6, and from thence into the smoke-stack 7.

The said twin tunnels 4 and 5 are, in the present illustration, separated by a longitudinal partition 8, which extends from the said receiving-chamber 2 to the receiving end of the said spray chamber 6.

Mounted upon suitable common hinges 9 attached to the adjacent end of the said partition 8, in the said receiving-chamber 2, is a suitable door or valve 10, which may be placed to close the entrance to either of the tunnels 4 and 5, and cause the smoke and fumes to pass into the one that is open, whereby one of the said tunnels may be used while the other one of the twin is being repaired, and while the condensed fumes are being scraped from the walls and floor of the closed tunnel and removed therefrom.

At the junction of the said twin tunnels 4 and 5 and the said spray chamber 6 I locate a series of four (4) or more chemical tanks 11, into the top of which the said tunnels 4, 5 and 6 open, to receive the precipitated metal that runs back from the said spray chamber, together with the waste spray-water, the said spray-chamber being inclined upwardly throughout its length, as is also the twin tunnels 4 and 5, and also the said passage 1, continuously from the furnaces of the smelter (not shown) to the said smoke-stack 7, the rate of inclination (or rise) being about 5%.

However, the rise may be increased or diminished in practice, as may be desired. In other words, the said condensing and spray chambers are inclined downwardly away from the said stack 7.

The said stack 7 is preferably about 200 feet high from the point of intersection therewith of the said spray-chamber 6, although when a fan or blower is used to create a draft through the tunnels, the height of said stack may be much less.

The said spray-chamber or single tunnel 6 is preferably about 600 feet in length, and located within it is a perforated spray-pipe 12, which extends the full length of said spray-chamber, and passes into and across the interior of the said smoke-stack, and is then extended upwardly in said stack to a height of about 60 feet above the plane of said chamber, where its upper end is closed by a common cap.

The opposite end of said spray-pipe is extended out through the wall of said spray-chamber, where it is to be connected to a suitable water-supply which will deliver the water under a suitable pressure.

Said spray-pipe 12 is supported directly beneath the ceiling of the said spray-chamber 6, centrally of said ceiling, so as to distribute the spray-water equally upon the opposite vertical walls of said chamber, and also upon the floor thereof, to intercept, cool, and precipitate the passing smoke and fumes, and wash the same from said floor and walls, and carry the precipitated particles to the said tanks 11.

This spray-pipe is to be 2 inches in diameter, or of any suitable size for the work required of it, and it has from 4 to 6 longitudinal lines of perforations of diminutive size, to produce the very finest spray possible, throughout its length within said spray-chamber, as well as within said smoke-stack, the vertical section of said pipe being also perforated for spraying the fumes which are escaping up said stack, during their upward passage therein.

Instead of a single spray-pipe 12 of large size I may provide more than one of a smaller size.

Likewise, the height, width and length of the tunnels may be increased or diminished, to afford more or less cooling surface for the smoke and fumes, as may be required by the size and capacity of the smelting plant; and I do not limit myself to the exact proportions or sizes of parts herein shown. The smoke-stack section of the spray-pipe 12, extending as it does to a considerable height in said stack, drops the spray-water (very much as the rain drops from the clouds) upon the ascending fumes above and at the point where they change their direction from a horizontal to a vertical path, and such operation has been found very efficient in dissolving and precipitating the fumes that escape from the horizontal spray-chamber, and which would otherwise be lost.

The operation of my invention will be readily understood by those skilled in the art, and therefore I will not further describe the same, except to mention that the spraying-devices are not to be placed in operation until after the smoke and fumes have been allowed to get up a fair speed in their passage through the tunnels, after which the spray may be turned on; also that the poisonous fumes from the furnaces will be cooled and condensed, as well as precipitated, to such an extent that very little (if any) objectionable or valuable material will be discharged at the top of the stack.

The precipitation and recovery of the metal contained in the said chemical tanks 11 may be accomplished in any known way.

Pieces of pig-iron 14, to precipitate the lead or other metal, are placed in said tanks.

The water that is forced through said spray-pipe 12 is charged with the usual chemicals, for acting upon the smoke and fumes.

I claim:

1. An improved fume and smoke arrester for smelting-plants, consisting of a horizontal condensing-passage into which the fumes pass from the furnace; a smoke-stack to which one end of said passage is connected; a horizontal perforated-pipe for spraying the interior of said horizontal passage; and a vertical perforated-pipe extending a considerable distance upwardly within said stack, and arranged thereat to drop spray-water upon the fumes, at and above the point where the fumes change their direction of movement from a horizontal to a vertical path.

2. An improved fume and smoke arrester for smelting-plants, consisting of a receiving-chamber connected to the furnace; a suction-fan in said receiving-chamber; two parallel horizontal condensing-chambers separated by a vertical partition, and having like ends connected to said receiving-chamber; means for temporarily closing the entrance of said condensing-chambers against fumes, whereby said condensing-chambers may be used alternately in cleaning out one of them; a horizontal spray-passage into one end of which both of said condensing-chambers open; a smoke-stack into which the opposite end of said spray-passage opens; a horizontal perforated-pipe for spraying the interior of said spray-passage; a vertical perforated-pipe extending a considerable distance upwardly within said stack, and arranged to drop spray-water upon the fumes at and above the point where the fumes change their direction of movement from a horizontal to a vertical path; said parallel condensing-chambers and said horizontal spray-passage being inclined downwardly away from the said stack; and a suitable basin located below the plane of the floor of said spray-passage, to receive the material that is washed thereinto by the spray-water.

In testimony whereof I have signed my name to this specification in the presence of two subscribing witnesses.

ANTONIO FERRARI.

Witnesses:
   ANGELO CORRUBIA,
   M. F. C. CANN.